UNITED STATES PATENT OFFICE.

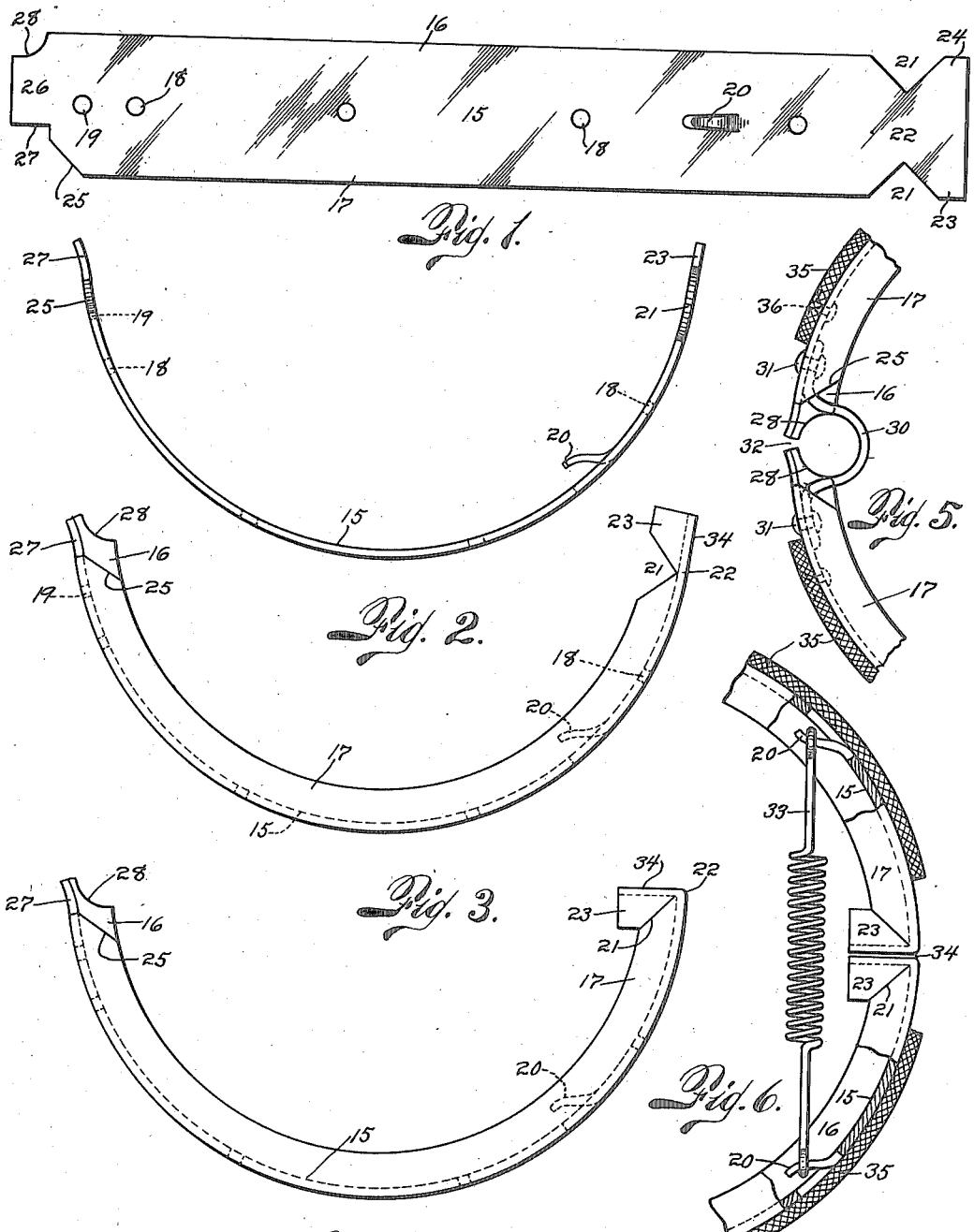

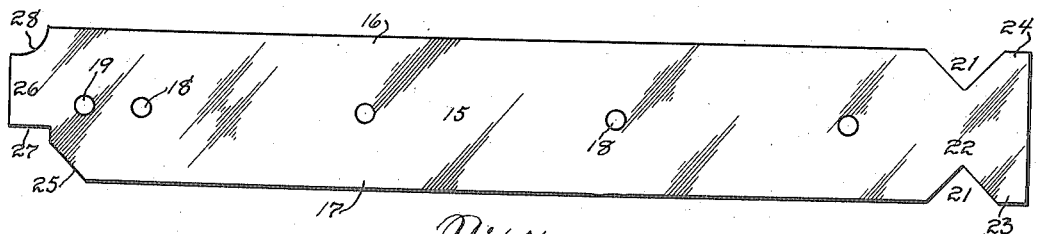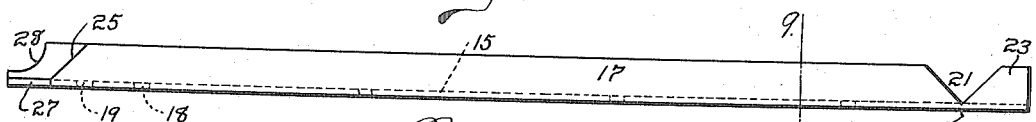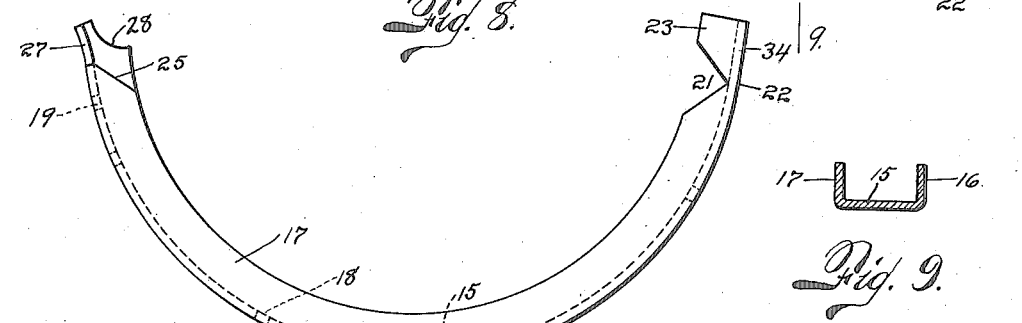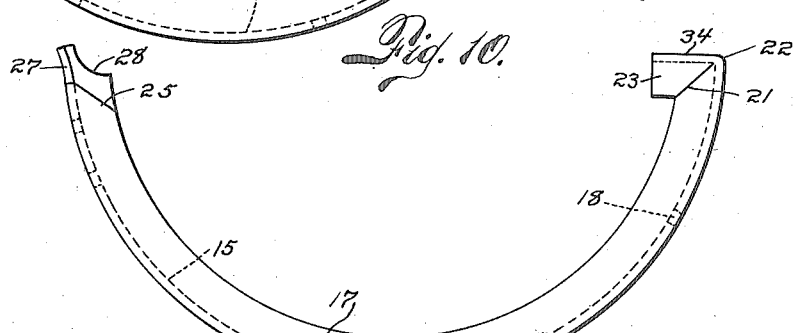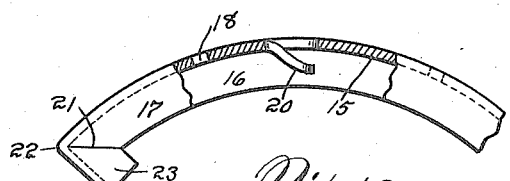

WILLIAM Q. HOWELL AND CRANSTON B. RADER, OF DENVER, COLORADO.

PRESSED-STEEL AUTOMOBILE BRAKE-SHOE CONSTRUCTION.

1,417,069.　　　　　　Specification of Letters Patent.　　Patented May 23, 1922.

Application filed April 4, 1921. Serial No. 458,203.

*To all whom it may concern:*

Be it known that we, WILLIAM Q. HOWELL and CRANSTON B. RADER, both citizens of the United States, and residing at the city and county of Denver and State of Colorado, have invented certain new and useful Improvements in Pressed-Steel Automobile Brake-Shoe Constructions; and we do hereby declare the following to be a full, clear, and exact description of the invention, such as will enable others skilled in the art to which it appertains to make, use, and carry out the same.

This invention relates to improved automobile brake-shoe constructions of that type wherein an annulus is formed, with an internal peripheral channel, by two segmental sections that are connected together at one of their ends while providing laterally projected contiguous cam engaging faces at their other ends, adapted for the reception of an operating cam head to control the expansion of said annulus for braking purposes.

The particular improvements devised embody the new departure of providing such an article of manufacture of pressed steel construction and likewise the method of forming the said segmental sections or members thereof from flat blanks of cold rolled sheet steel of comparatively thin gauge.

While they might be employed in other analogous relations, this particularly improved brake-shoe has been primarily designed for use with the cylindrical brake drum of that type of automobiles wherein the said brake drum is concentrically attached to the hub of a traction wheel and houses the expansible brake shoe elements as is well understood.

The main object of the invention is to provide such brake-shoe sections of a more suitable and comparatively light weight metal than has heretofore been found practicable, without in any way, however, impairing the efficiency thereof by sacrificing their strength, durability and wearing qualities generally, which are all so essentially requisite for proper functioning, owing to the great strains and stresses imposed thereon.

These and other objects and advantages, however, will be so clearly apparent, as incidental to the following disclosure, that no useful purpose would be served by further enlarging upon them initially, and with these general prefacing remarks, therefore, reference will now be immediately had to the accompanying drawings, illustrating certain practical embodiments of the improvements, in which drawings—

Figure 1 is a top plan view of a flat blank for forming one of said brake-shoe sections, which flat blank may be wholly cut and punched, from a suitably dimensioned strip of cold rolled sheet steel, by a single operation and in accordance with one way of carrying forward the sequential steps of our broader method;

Figure 2 is an edge view of the same as shaped into segmental form in a subsequent step;

Figure 3 is a view analogous to Figure 2, but with the previously flatwise segmental member now pressed into internally channeled form in a further step of the method;

Figure 4 is a view analogous to Figure 3, but with one end of the channeled segmental section now bent over laterally, to provide a cam engaging face portion, in the final step of this particular method;

Figure 5 is a fragmentary edge elevational view of a pair of said finished segmental sections as they may be connected together at one of their ends;

Figure 6 is a fragmentary view analogous to Figure 5, but taken at a diametrically opposite position thereto, and portions of the channeling webs being broken away to show more clearly the mounting of a spring retractile element;

Figure 7 is a top plan view analogous to Figure 1, but embodying another method wherein the retractile spring mounting lug or hook need not be stamped out in the initial cutting and punching step;

Figure 8 is a side elevational view of the same, but after having been pressed up into channeled form before being shaped segmentally;

Figure 9 is a cross sectional view on the line 9—9 of Figure 8;

Figure 10 is a view analogous to Figure 3, but the segmental member having been formed after the prior step of channeling in straightwise position;

Figure 11 is a view analogous to Figure 4, but with the retractile spring mounting hook not yet stamped out; and Figure 12 is a fragmentary inverted view of Figure 11 wherein the retractile spring mounting hook may be stamped out, in the final step of this particular method, over a suitable anvil having a recess in its periphery to receive the depressed hook element.

As the invention more particularly embodies the article of manufacture and the segmental members thereof as formed by the method or methods herein disclosed, it may be more expedient, for brevity's sake and to more clearly set forth the same, to simply describe both in a concurrently co-incident manner, and by designating the same parts in all of the views by the same reference characters.

To this end, the numeral 15 indicates a flat elongated blank of suitable dimensions in cross-section, and preferably cut and punched, in a single operation for the saving of time and economy in general, from cold rolled sheet steel of approximately #14 gauge. The longitudinal edge surfaces of the blank are indicated by the separate numerals 16 and 17, as they are later pressed up into the form of curved side webs in shaping the internally channeled segmental brake-shoe sections.

In the initial cutting and punching operation, this elongated blank is formed, or may preferably be formed as shown at Figure 1, with rivet apertures 18 and 19, an integrally joined stamped out spring attaching hook 20, the triangular edge recesses 21 towards one end, forming a neck-like portion 22 and a head providing side flap projections 23—24, and at its other end the blank providing the beveled edge face 25 and a terminal lip or tongue 26, which latter is formed with a curved edge face at one side, indicated at 28, and may have a straight edge face 27 at the other side.

The cut and punched section of Figure 1 is now set into proper association with a press that provides a suitable die block having a substantially semi-cylindrical enlarged recess, of a width to freely receive the section 15 flatwise, which larger recess merges into a narrower concentric base recess or curvilinear channel, and the said press also providing a concentrically cooperating die, of a cross-sectional width that is just sufficiently less than the width of said base recess to permit of the concentric die to enter the same with its periphery and contiguous walls encompassed by the central surface and the longitudinal side surfaces, respectively, of said cut and punched section 15—16—17. It is also to be understood that the peripheral face of said die is substantially recessed at proper position to receive the inwardly projected hook element 20.

Upon operating the die element downwardly, therefore, the section 15—16—17 is first curvilinearly formed while remaining flatwise in cross-section, as shown at Figure 2, when it is being bodily pressed towards the peripheral wall of the larger recess of the die block, after which and upon a continued downward stroke it will be obvious that this final pressure will cause the side surfaces 16—17, of the then curved section, to be turned up into the form of side flanging webs, as the die with its encompassing sheet metal is forced down into the narrower base recess, so that the blank now appears as in Figure 3. While we have mentioned the operation of the die in a downward direction, as perhaps the most expedient way, it will be understood of course that we do not limit ourselves to such downward actuation, as the operation is the same regardless of the positioning of the die block and die, provided that the latter is operated radially of the recesses of the die block.

After these bending and channeling operations, the headed end is then bent over inwardly, by any suitable means, until the complementary opposed edge faces of the recesses 21 meet in abutting and trussing relation, as shown at Figure 4, whereupon the side flap projections 23—24 are extended inwardly in the same planes as the flanged side webs 17 and 16, respectively, while the underneath surface of the head portion becomes an inwardly disposed transverse cam engaging face 34.

It being understood that these segmental sections are made for complemental paired assembly, in oppositely disposed relation, it will likewise be understood that they are substantially of analogous formation, but with the exception of course that they are in reality made in sets, so that the edge faces 25—27—28 of one set are oppositely cut or transposed with relation to the same edge faces of the other set.

These various steps being completed, the segmental sections are now ready for assembly, as will be illustrated at Figures 5 and 6, but before describing the assembly of the same, we will first further refer to a slightly different method of pressing up the segmental sections, in accordance with the illustrations of Figures 7 to 12.

Although in these latter views the method practiced is substantially the same in many respects to that previously described, still the sequential order of steps is slightly altered in that the hooking lug element 20 need not necessarily be stamped out in the initial cutting and punching operation, as shown omitted at Figure 7, and further inasmuch as the prepared flat blank is first channeled in straightwise position, as indicated at Figures 8 and 9, after which it is pressed up into channeled curvilinear form, as at Figure 10, these steps being accomplished in separate operations as contradistinguished to the substantially continuous operation as heretofore described with reference to Figures 2 and 3. Finally the stamping out of the hooking lug 20, as integrally joined with the base web 15, may be accomplished either before or after the headed end 23—24 has been bent inwardly as at Figure 11. Assuming that it is done afterwards, however, the operation will be clearly apparent from the inverted view at Figure 12, where the hooking lug 20 is stamped out over a suitable curved anvil (not shown) which is peripherally socketed or recessed to receive the depressed hooking lug.

Referring now to Figures 5 and 6, in the assembling of the segmental sections the tongued ends 26 thereof are preferably connected together by means of a very stiff hinging element that has a central semi-circular body portion 30 which terminates in endwise continuing attaching ears. These latter are suitably secured to the opposite abutting ends of said segmental sections, as by means of the rivets 31 passing through the rivet holes 19, so as to leave a slight clearance space 32 between the tongue ends 26, and the semi-circular portion 30 forms with the opposed curved edge faces 28 a bearing for a hinge pin (not shown) serving also as a centering support for the brake-shoe as a whole within its encompassing brake drum housing.

At a diametrically opposite position, the cam engaging faces 34 are contiguously aligned in slightly spaced relation, between which faces 34 there will be disposed the operating cam head (not shown) for controlling the expansion of the brake shoe sections, as is well understood. The functioning of the retractile spring element 33 is also fully understood, the ends thereof providing eyes for attachment over the hooking lugs 20 of the opposed segments.

It will also be understood that before assembling the segments it is desirable to exteriorly line their peripheries with a suitable brake lining indicated at 35, and which may be attached thereto by means of the rivets 36 passing through the apertures 18.

It is believed that the full advantages of our invention will be quite apparent, especially to those engaged in the brake construction field of the automobile industry, in the production of an extremely desirable commensurately light and highly trussed, strong and durable brake-shoe of pressed sheet steel formation, and particularly with relation to the methods of shaping up the same in a comparatively minimum number of simple, time saving and otherwise economical steps generally.

While we have thus fully set forth our invention, it will be understood, however, that we do not wish to unnecessarily restrict ourselves to all of the details exactly as disclosed, excepting as they may come within the terms of the ensuing claims, and as fairly interpreted in the light of the specification if necessary, but what we do claim as new and patentable is:—

1. An annular brake shoe of the character disclosed, in which the curvilinear complementary sections thereof are each shaped from a suitably dimensioned initial flat blank of sheet metal that is subsequently bent into the integral form of an internally channeled segmental section providing a trussed engaging face for an operating expanding element, substantially as described.

2. An annular brake shoe of the character disclosed, in which the curvilinear complementary sections thereof are each shaped from a suitably cut and punched initial flat blank of sheet metal of suitable thickness, which cut and punched blank is subsequently bent into the integral form of an internally channeled segmental section, providing a trussed engaging face for an operating expanding element, substantially as described.

3. An annular brake shoe of the character disclosed, in which the curvilinear complementary sections thereof are each shaped from a flat blank of sheet metal of suitable thickness, which flat blank is cut to initially provide triangular side edge face recesses towards one end thereof, forming a neck terminating in a head portion, the said cut blank being subsequently bent into the integral form of an internally channeled segmental section, and the said head portion being inturned at its neck for closing said side edge face recesses, to provide a trussed engaging face for an operating expanding element, substantially as described.

4. An annular brake shoe of the character disclosed, in which the curvilinear complementary sections thereof are each shaped from a flat blank of sheet metal of suitable thickness, which flat blank is simultaneously punched and cut to initially provide a longitudinal series of apertures and triangular side edge face recesses towards one end thereof, forming a neck terminating in a head portion, the said punched and cut blank being subsequently bent into the integral form of an internally channeled segmental section, and the said head portion being inturned at its neck for closing said side edge face recesses, to provide a trussed engaging face for an operating expanding element, substantially as described.

5. An annular brake shoe of the character disclosed, in which the curvilinear complementary sections thereof are each shaped from a flat blank of sheet metal of suitable thickness, which flat blank is simultaneously punched and cut to initially provide a longitudinal series of apertures, a tongue at one end having a curved side edge face, and triangular side edge face recesses towards the other end thereof, forming a neck terminating in a head portion, the said punched and cut blank being subsequently bent into the integral form of an internally channeled segmental section, and the said head portion being inturned at its neck for closing said side edge face recesses, to provide a trussed engaging face for an operating expanding element, substantially as described.

6. An annular brake shoe of the character disclosed, in which the curvilinear complementary sections thereof are each shaped from a flat blank of sheet metal of suitable thickness, which flat blank is simultaneously punched, stamped and cut to respectively provide initially a longitudinal series of rivet apertures, an integral inwardly depressed hooking lug, and a pair of opposite side edge face flaring recesses towards one end thereof, the latter forming a neck terminating in a head portion, the said blank as so prepared being subsequently bent into the integral form of an internally channeled segmental section, and the said head portion being inturned at its neck for closing said side edge face recesses, to provide a trussed engaging face for an operating expanding element, substantially as described.

7. An annular brake shoe of the character disclosed, in which the curvilinear complementary sections thereof are each shaped from a flat blank of sheet metal of suitable thickness and quality, which flat blank is simultaneously punched, stamped and cut to respectively provide initially a longitudinal series of rivet apertures, an integral inwardly depressed hooking lug, a tongue at one end having a curved side edge face, and a pair of opposite side edge face flaring recesses towards the other end thereof, the latter forming a neck terminating in a head portion, the said blank as so prepared being subsequently bent into the integral form of an internally channeled segmental section, and the said head portion being inturned at its neck for closing said side edge face recesses, to provide a trussed engaging face for an operating expanding element, substantially as described.

8. The method of shaping the complementary curvilinear sections for brake shoes of the character disclosed, which embodies the steps of cutting a flat blank of suitable sheet metal to initially provide a pair of opposite flaring side edge recesses towards one end thereof, which form a neck terminating in a head portion, bending said cut blank element into the integral form of an internally channeled segmental section, and bending said head portion over inwardly at its neck position, for closing said flaring recesses and providing a trussed engaging face for an operating expanding element, substantially as described.

9. The method of shaping the complementary curvilinear sections for brake shoes of the character disclosed, which embodies the steps of punching and cutting simultaneously a flat blank of suitable sheet metal to respectively provide initially a longitudinal series of apertures, and a pair of opposite flaring side edge recesses towards one end thereof, the latter forming a neck terminating in a head portion, bending said cut and punched blank element into the integral form of an internally channeled segmental section, and bending said head portion over inwardly at its neck position, for closing said flaring recesses and providing a trussed engaging face for an operating expanding element, substantially as described.

10. The method of constructing the complementary curvilinear sections for brake shoes of the character disclosed, which embodies the steps of simultaneously cutting a flat blank of suitable sheet metal to initially provide a tongue at one end, having a curved side edge face, and a pair of opposite flaring side edge recesses towards the other end thereof, the latter forming a neck terminating in a head portion, bending said cut blank element into the integral form of an internally channeled segmental section, and bending said head portion over inwardly at its neck position, for closing said flaring recesses and providing a trussed engaging face for an operating expanding element, substantially as described.

11. The method of constructing the complementary curvilinear sections for brake shoes of the character disclosed, which embodies the steps of simultaneously punching and cutting a flat blank of suitable sheet metal to respectively provide initially a longitudinal series of apertures, a tongue at one end, having a curved side edge face, and a pair of opposite flaring side edge face recesses towards the other end thereof, the latter forming a neck terminating in a head portion, bending said punched and cut blank element into the integral form of an internally channeled segmental section, bending said head portion over inwardly at its neck position, for closing said flaring recesses and providing a trussed engaging face for an operating expanding element, and stamping out an integral inwardly depressed hooking lug, substantially as described.

12. The method of constructing the complementary curvilinear sections for brake shoes of the character disclosed, which embodies the steps of simultaneously punching, stamping and cutting a flat blank of suitable sheet metal to respectively provide initially a longitudinal series of rivet apertures, an integral inwardly depressed hooking lug, a tongue at one end having a curved side edge face, and a pair of opposite flaring side edge recesses towards the other end thereof, the latter forming a neck terminating in a head portion, bending the said blank element as so prepared into the integral form of an internally channeled segmental section, and bending said head portion over inwardly at its neck position, for closing said flaring recesses and providing a trussed engaging face for an operating expanding element, substantially as described.

In testimony whereof, we affix our signatures.

WILLIAM Q. HOWELL.
CRANSTON B. RADER.